D. L. EMERSON.
Harvester Cutter.

No. 33,918. Patented Dec. 10, 1861.

Witnesses:
Joseph Prevatt
W. L. Bennew

Inventor:
Daniel L. Emerson.
by C. S. Renwick, Attorney

UNITED STATES PATENT OFFICE.

DANIEL L. EMERSON, OF ROCKFORD, ILLINOIS, ASSIGNOR TO MARY MANNY, OF SAME PLACE.

IMPROVEMENT IN HARVESTERS.

Specification forming part of Letters Patent No. 33,918, dated December 10, 1861.

*To all whom it may concern:*

Be it known that I, DANIEL L. EMERSON, of Rockford, in the county of Winnebago and State of Illinois, have invented certain new and useful Improvements in Harvesters; and I do hereby declare that the following is a full, clear, and exact description of my said invention, reference being had to the accompanying drawings, in which—

Figure 1:
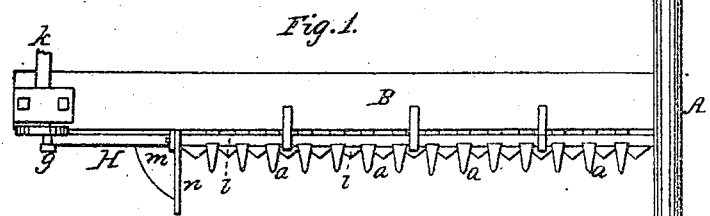
Figure 2:
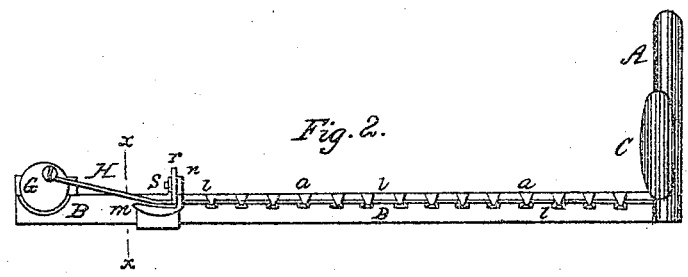
Figure 3:
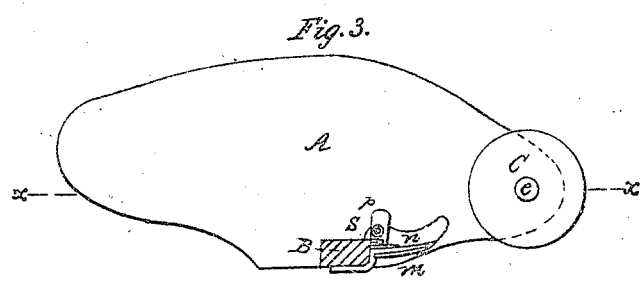
Figure 4:

Figure 1 represents an application of my improvements to the finger-beam of a harvesting-machine. Fig. 2 represents a front elevation of the same. Fig. 3 represents a vertical transverse section of the machine at the line $x$ $x$ of Fig. 2, and Fig. 4 represents a horizontal section of the divider of the machine at the line $x$ $x$ of Fig. 3.

My invention is divided into parts, the first of which has reference to harvesting-machines of all descriptions, which are fitted with a divider to divide the portion of the crop to be cut from that which is standing. In harvesting-machines constructed previous to my invention the divider is a pointed wedge-formed instrument whose point is formed by the front converging extremities of its sides, top, and bottom when the divider is solid, and by the converging extremities of its ribs or boards when the divider is in skeleton form. A divider with such a rigid point is objectionable for several reasons. In the first place, when acting upon lodged grain or grass, it gathers a bunch of the grass or grain upon its point by breaking off the grass or grain or pulling it up by the roots, and this bunch, carried along upon the divider, crushes down the crop into which the divider enters, so that a portion of the crop which is divided off to be cut by the cutter of the harvester is imperfectly cut, while a portion of the crop left uncut at the outer side of the divider is not in a position to be properly cut when the machine returns to cut the next succeeding swath. Again, the resistance of the standing crop to the onward movement of the bunch carried by the rigid point of the divider presents a serious impediment to the forward movement of the divider, thus tending to cause the divider side of the machine to lag behind the side at which the horses are hitched, and causing a very heavy side draft. Moreover, the bunch gathered upon the point of the divider does not tend to detach itself, but, on the contrary, continually increases in size by fresh accumulations until the resistance to the forward movement of the divider becomes so great that it becomes necessary to stop the machine, to back it so as to disengage the divider from the bunch of material, and to make a fresh start. In lodged grain or grass these stoppages are frequently required, and a large amount of time is consumed thereby.

The object of the first part of my invention is to obviate the defects of preceding dividers; and it consists in combining the body of the divider with a wheel located at its front extremity, so that this wheel takes the place of the point of the divider and becomes itself the front end of the divider. The wheel so located should be combined with the divider in such manner that clogging matter cannot catch in the interstice between the surface of the wheel and the body of the divider to which it is secured. The wheel-pointed divider thus formed presents a yielding surface to the crop to be divided for cutting, and the wheel turns in one direction or the other, according to the strains to which it is subjected. If, for example, stalks or leaves of lodged grass tend to go upward when struck by the wheel-point, its surface moves with them and tends to disentangle them without breaking them or tearing up the roots; and if, on the other hand, stalks or leaves tend to go downward, the wheel turns downward and disengages itself from them, so that the accumulation of the lodged material upon the divider and the difficulties that arise therefrom are materially lessened or entirely prevented. Moreover, the wheel at the point of the divider is frequently brought into use as a carrying-wheel when the machine is crossing furrows or sudden depressions, and by rolling on the ground prevents the divider from digging point foremost into it and obstructing the forward movement of the machine.

The second part of my invention has reference to the means of imparting a reciprocating movement to the cutter of a harvester. In machines constructed previous to my invention it has been customary to connect the end of the cutter with the crank or other means of imparting a reciprocating motion by means of a pitman or connecting-rod, which is jointed to the end of the cutter by a hinge-joint. A joint of this construction must of necessity be made heavy to be sufficiently strong. It is also subjected to great wear from the rapid movement of the parts, and from the fact that it is in a position to catch dirt, which is ground in the joint by the rapid motion. The play produced by this wear causes a jar at each reversal of the motion of the cutter, which strains the machinery, and is a frequent cause of breakage; and the wear in this joint renders it necessary to repair the wearing-surfaces. The object of my invention is to obviate these defects by doing away with the joint between the pitman and the cutter; and my invention consists in combining the cutter of a harvester with a pitman by means of a connection that is flexible, and is located at the end of the pitman nearest the cutter, so as to permit the farther end of the pitman to work upon the crank-pin or other means of imparting motion to the cutter without the employment of a hinged joint between the two. The mode of constructing this part of my invention which I prefer is to form the pitman in one piece with the plate of the cutter, and to obtain the requisite flexible connection at the end of the cutter by thinning the metal there, the remainder of the pitman being strengthened or rendered stiff by securing an additional piece of metal upon it if the metal of the plate of the cutter does not of itself afford the requisite stiffness. The flexible connection of the pitman dispenses with a hinged joint at the cutter and with all play at such joint, and obviates the evils that are incident to the use of such a joint. It also permits the parts to be made of less weight and with less expense.

The object of the third part of my invention is to obviate the injurious effects that are caused by the wear of the parts at the end of the cutter adjacent to the pitman. It is well known that the action of the pitman upon the cutter of a harvester causes great wear in the bearings of the cutter at the end at which the pitman takes hold of it. This wear of the parts increases the size of the slot through which the cutter plays, and permits grass, leaves, and stalks to catch in the space between the cutter and its bearings and clog the cutter. The object of this part of my invention is to obviate this difficulty; and it consists in combining the shoe which forms the bearing of the cutter adjacent to the pitman with an adjustable guide, which can be set up against the cutter as the bearing wears away, so as to compensate for the wear and prevent excessive play. As the lower bearing of the cutter at the pitman end is generally a strong metal shoe, and as by my invention the adjustable guide is combined with this shoe, the guide cannot spring away from the bearing, and the cutter may always be kept moving in close proximity with the bearing in the shoe, however much the latter may be worn away.

In the portion of a harvesting-machine represented in the accompanying drawings the body A of the divider is formed of a plank, and is made fast to the finger-beam B, the portions of the divider which project in advance of the finger-beam and behind it being of about equal length. The wheel C is located at the extreme front end of the body of the divider, and in this instance is overhung at the inner side of the divider, the pivot or axle e, on which the wheel turns being secured transversely into the front extremity of the divider. The side of the wheel C which is next to the body of the divider is hollowed out to receive the front extremity, d, thereof, which is sloped off so that its outer face, at its point, is within the plane of the rim of the wheel. The rim of the wheel thus overlaps the point of the body of the divider, and, by guiding the grain-stalks, &c., past the edges of the interstice between the wheel and that body, prevents the catching of clogging matter therein. In cases where the wheel-axle is to be supported on both sides of the wheel, both faces of the wheel should be hollowed, so that its rim may overlap both side bearings of the axle.

The sickle or cutter i (represented in the drawings) is of the usual scalloped variety, and is arranged to reciprocate through the slots of fingers a. It is caused to reciprocate by the revolution of a crank-pin, g, with which it is connected by means of the flexible pitman H. This pitman has at one extremity a stub end or eye, which fits upon the crank-pin. It is in this instance a prolongation of the plate of the sickle, and is thinned down adjacent to the end of the sickle until it forms a connection therewith that is sufficiently flexible there to permit its stub end to work freely upon the crank-pin. The crank-pin is secured to a hub or small wheel upon a shaft, k, to which a continuous rotary motion is imparted in the usual manner. The end of the sickle nearer the pitman runs in a flat shoe, m, surmounted by an edge plate, n, to which the adjustable guide r is secured. The guide consists in this instance of a block perforated with a vertical slot, through which a screw-bolt, s, is passed, which secures the adjustable guide to the edge plate, n, of the shoe. When the machine is to be made ready for operation, the guide r is adjusted by moving it downward until the cutter is left with sufficient play to permit it to move freely, and the guide is then made fast by tightening the screw. When the parts in contact with the cutter are reduced by wear, the screw is slacked, the guide is set down to compensate the wear, and the screw is again tightened. The means of adjustment are so simple that the adjustment may be made by any farmer, who thus has it in his power to obviate the jarring and strain to the parts of the machine that arise from too great play, and to prevent the accumulation of clogging matter in the bearings of the cutter at the shoe. The adjustable guide may be fitted with a friction-wheel to bear upon the cutter, if such an addition be deemed expedient.

Any of the above parts of my invention may be used without the others, if deemed expedient; but I believe a harvester which embodies all parts of my invention will be superior to one that only uses one or two parts thereof.

What I claim as my invention, and desire to secure by Letters Patent, is—

1. The combination of a wheel with the body of a divider for a harvesting-machine in such manner that the wheel forms the front end of the divider, substantially as described.

2. The combination of a reciprocating cutter of a harvesting-machine with a stiff pitman by means of a flexible connection at the end of the pitman that is nearer the cutter, substantially as described.

3. The combination of the shoe which forms the bearing of the cutter of a harvesting-machine with an adjustable guide secured to said shoe, substantially as described.

In testimony whereof I have hereunto subscribed my name.

DANIEL L. EMERSON.

Witnesses:
M. B. DERRICK,
J. G. MANLOVE.